United States Patent [19]
Ohnishi et al.

[11] Patent Number: 5,748,795
[45] Date of Patent: May 5, 1998

[54] IMAGE DECODER USING ADJUSTABLE FILTERING

[75] Inventors: Shinji Ohnishi; Akio Fujii, both of Yokohama, Japan

[73] Assignee: Canon Kabushiki Kaisha, Tokyo, Japan

[21] Appl. No.: 596,558

[22] Filed: Feb. 5, 1996

[30] Foreign Application Priority Data

Feb. 7, 1995 [JP] Japan ................................. 7-019064

[51] Int. Cl.⁶ ........................................... G06F 9/00
[52] U.S. Cl. ................... 382/251; 364/DIG. 1; 348/420; 348/404
[58] Field of Search .......................... 348/384, 607; 358/433, 201.2; 382/251

[56] References Cited

U.S. PATENT DOCUMENTS

| | | | |
|---|---|---|---|
| 4,722,002 | 1/1988 | Mochizuki et al. | 348/384 |
| 4,951,139 | 8/1990 | Hamilton et al. | 348/404 |
| 5,097,331 | 3/1992 | Chen et al. | 348/398 |
| 5,253,075 | 10/1993 | Susiyama | 358/261.2 |
| 5,422,736 | 6/1995 | Katayama | 358/462 |
| 5,452,104 | 9/1995 | Lee | 358/433 |
| 5,499,057 | 3/1996 | Kondo et al. | 348/607 |
| 5,563,662 | 10/1996 | Kishi | 348/420 |

*Primary Examiner*—Tod R. Swann
*Assistant Examiner*—David Langjahr
*Attorney, Agent, or Firm*—Fitzpatrick, Cella, Harper & Scinto

[57] ABSTRACT

Noise contained in a reproducing image signal is suppressed by performing a filtering operation on an image signal obtained by decoding data that has been coded with a unit of a block consisting of m×n pixels. A filter circuit having a plurality of filter characteristics suppresses noise, and a characteristics selection circuit switches the filter characteristics of the filter circuit by use of a quantizing parameter employed for coding the image signal.

23 Claims, 6 Drawing Sheets

| DEFINITION | QUANTIZING COEFFICIENT | QUANTIZING ERRORS |
|---|---|---|
| LOWER ↕ HIGHER | SMALLER ↕ GREATER | SMALLER ↕ GREATER |

IMAGE DECODER USING ADJUSTABLE FILTERING

BACKGROUND OF THE INVENTION

1. Field of the Invention

The present invention relates to an image signal decoder suitable, for example, for decoding image signals which have been compressed according to a block coding method.

2. Description of the Related Art

The orthogonal transform coding method is known as a technique of coding an image signal in a compressing fashion with high efficiency. In this method, an image signal is divided and formed into blocks, each consisting of a predetermined number of m×n pixels (m, n: integers). Then an, orthogonal transformation, such as a discrete cosine transformation (DCT), is performed on the pixel blocks. The coefficients obtained by performing DCT processing are further quantized and entropy-coded. Conversely, the coded data can be decoded by undergoing entropy decoding, dequantizing and inverse orthogonal transformation. For suppressing noise, a filtering operation is further carried out on the digitized image data subjected to inverse orthogonal transformation, whereby noise components can be attenuated. The filtering operation is performed because the data contains noise components due to quantizing errors after being quantized and dequantized. The filtered data is displayed on a monitor or the like.

The DCT processing method and the resulting quantizing coefficients vary by blocks. According to the above-described method, however, a similar filtering operation is equally and unconditionally performed on all the pixels. This necessitates that the filtering operation be performed more intensely on the whole pixels for the purpose of inhibiting image blurring and that the filtering operation be performed less intensely on the whole pixels with a view to reducing noise. More specifically, the conventional image signal decoder cannot perform a suitable filtering operation in accordance with the coding method and the degree of image degradation, thereby making it impossible to obtain filtered images of high quality.

SUMMARY OF THE INVENTION

Accordingly, in view of the above background, it is an object of the present invention to provide an image signal decoder which is capable of performing a suitable filtering operation in response to the degree of image degradation.

It is another object of the present invention to provide an image signal decoder which is adequate to perform an appropriate filtering operation according to the coding method employed.

In order to achieve the above objects, according to a first aspect of the present invention, there is provided an image signal decoder in which a filtering operation is performed on a reproducing image signal obtained by decoding data coded by a unit of a block consisting of m×n pixels, thereby suppressing noise contained in the signal, the image signal decoder including a filter circuit for suppressing noise, having a plurality of filter characteristics, and characteristic selection means for selecting the filter characteristics inherent in the filter circuit by use of quantizing parameters employed when the image signal is coded.

According to a second aspect of the present invention, the image signal decoder further comprises an input terminal for inputting motion information on the reproducing image signal and a selection switch for selecting either of pixels in the same field or pixels in the same frame in accordance with the motion information that has been input through the input terminal.

Provided with the technical means discussed above, the image signal decoder according to the first aspect of the present invention selects suitable filtering characteristics for carrying out a filtering operation in accordance with the quantizing parameters employed when the image signal is coded, thus making it possible to perform the filtering operation utilizing appropriate filtering coefficients in response to the degree of image deterioration.

Moreover, according to the second aspect of the present invention, either of pixels in the same field or pixels in the same frame are selected in response to the motion information on the reproducing image signal. With this arrangement, as well as the above arrangement according to the first aspect of the present invention, a filtering operation is performed utilizing suitable coefficients depending on the degree of image degradation. Additionally, an appropriate filtering operation is carried out in accordance with the coding method employed.

Further objects, features and advantages of the present invention will become apparent from the following description of the preferred embodiments with reference to the attached drawings.

DETAILED DESCRIPTION OF THE PREFERRED EMBODIMENTS

A description is given below of an embodiment of an image signal decoder according to the present invention with reference to the drawings.

Figure 1:
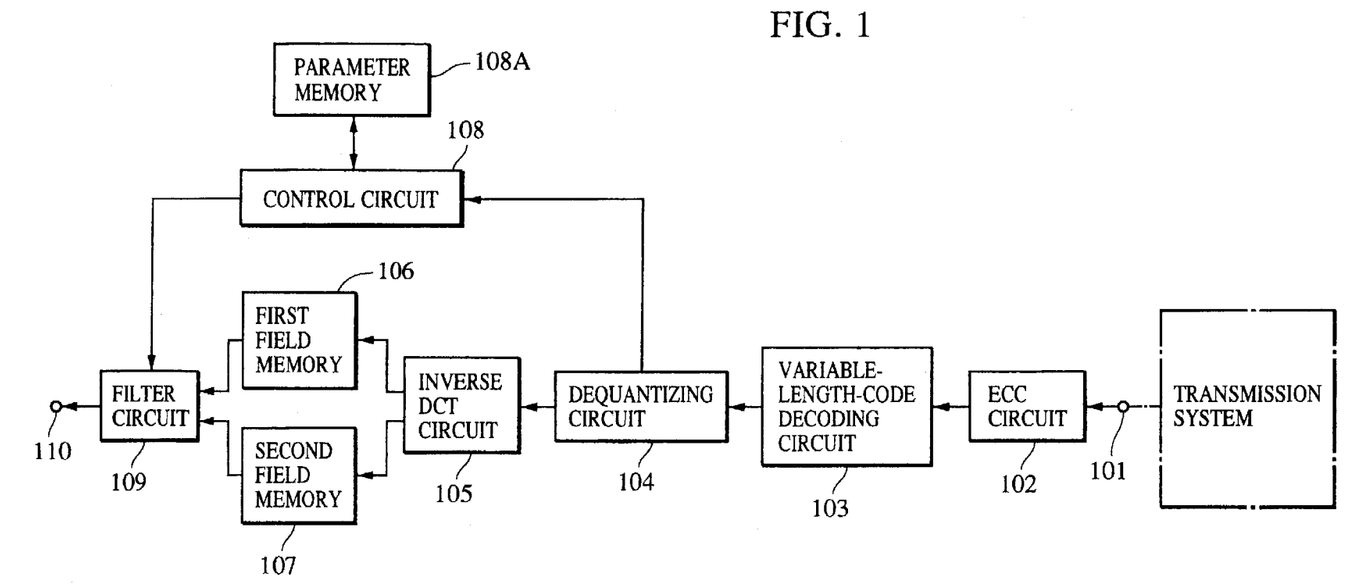
FIG. 1 is a block diagram of the construction of a first embodiment of an image signal decoder according to the present invention.

FIG. 1 is a block diagram of an image signal decoder according to a first embodiment of the present invention. The image signal decoder includes an input terminal 101 for receiving coded data sent from a predetermined transmission system, an error correcting code (ECC) circuit 102 for correcting code errors of reproducing data, and a variable-length-code decoding circuit 103 for decoding variable-length data. It should be noted that the above-mentioned transmission system includes a magnetic recording/reproducing apparatus for use in a VTR, an optical recording/reproducing apparatus, such as a CD-ROM, and various types of networks. Also, the above-described coded data is obtained by use of various parameters, such as predetermined quantizing parameters. Added to the data are coded image data, parameters, such as the above-mentioned quantizing parameters, and information indicating whether the data is concerned with a moving block or a still block.

The image signal decoder also includes a dequantizing circuit 104 for dequantizing the coded data utilizing the above-described parameters and transforming it to DCT coefficients, an inverse DCT circuit 105 for transforming the DCT coefficients to image data, a first field memory 106 for storing image data of a first field, and a second field memory 107 for storing image data of a second field. The image signal decoder further includes a control circuit 108 including a parameter memory 108A used for storing the quantizing parameters employed for dequantizing processing, a filter circuit 109 for reducing noise of the image data based on the quantizing parameters, and an output terminal 110.

In the image signal decoder constructed as described above, a reproducing image signal sent from a recording medium (magnetic tape or the like) is input into the ECC circuit 102 through the input terminal 101. Subsequently, the data has its code errors corrected in the ECC circuit 102 and is decoded in the subsequent stage of the variable-length-code decoding circuit 103. The decoded data is then sent to the dequantizing circuit 104 in which the data is dequantized based on the quantizing parameters and is also transformed to DCT coefficients.

The quantizing parameters are output to the control circuit 108 in which they are temporarily stored in the parameter memory 108A, and meanwhile, the transformed DCT coefficients are output to the inverse DCT circuit 105. The inverse DCT circuit 105 executes inverse DCT processing based on the motion information concerning the given block and transforms the DCT coefficients to items of image data which are then sent to the first and second field memories 106 and 107, respectively. The respective items of image data are sent to the filter circuit 109 from the first and second field memories 106 and 107. The items of image data are filtered in the filter circuit 109, attenuating noise components, and are output to the output terminal 110.

The filter circuit 109 in this embodiment is adapted to select filtering characteristics used for filtering the image data in response to the quantizing parameters read from the parameter memory 108A.

Figure 2:
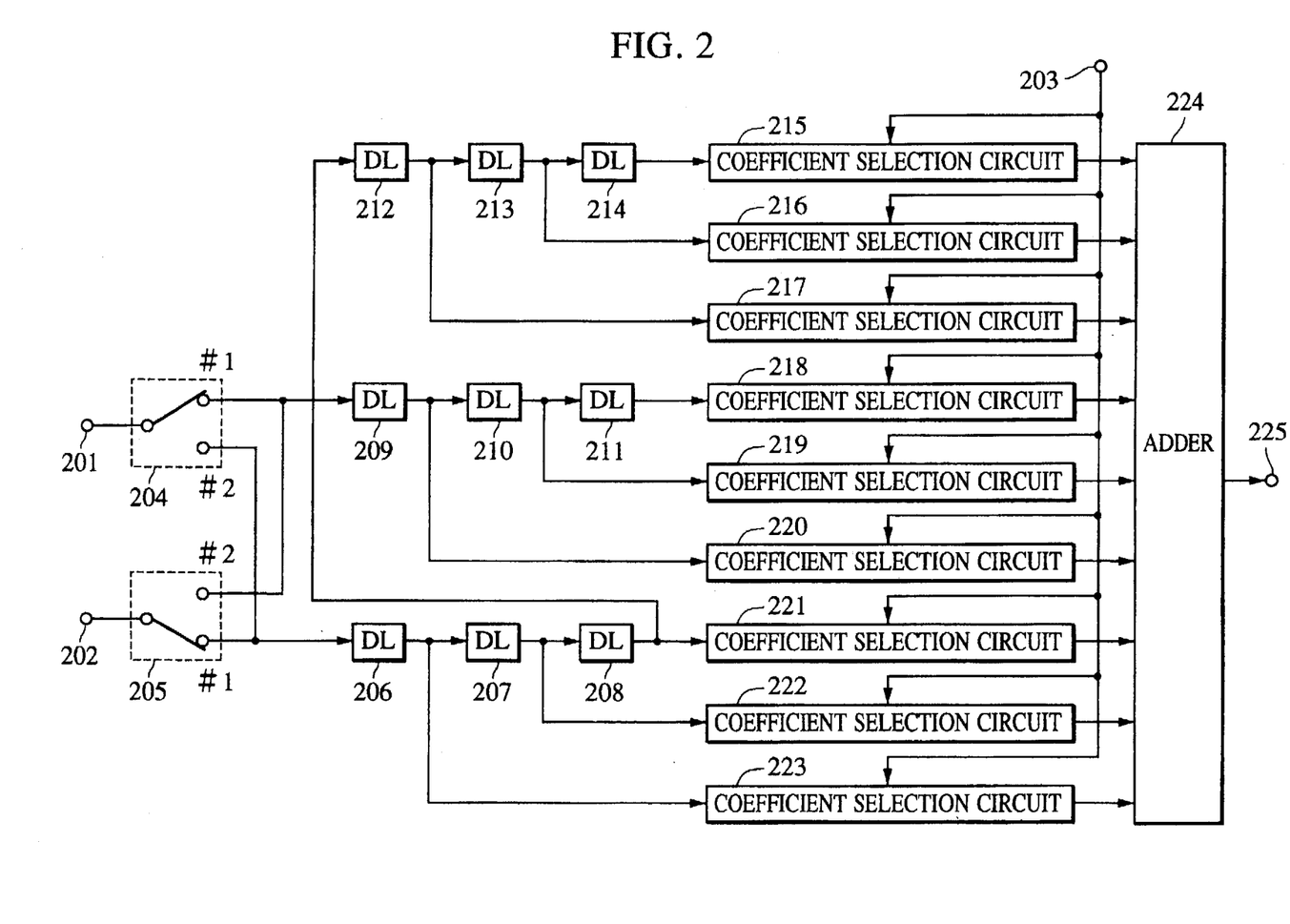
FIG. 2 is a block diagram of the construction of a filter circuit for use in the image signal decoder of the first embodiment.
Figure 3:
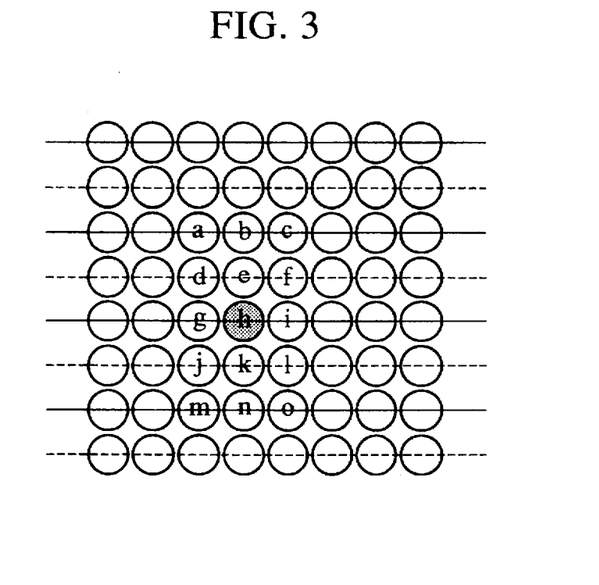
FIG. 3 illustrates the filtering operation performed in the present invention.

The operation of the filter circuit 109 is described in greater detail below with reference to FIGS. 2 and 3. FIG. 2 illustrates an example of the construction of the filter circuit 109, while FIG. 3 illustrates the operation of the filter circuit 109 shown in FIG. 2.

The filter circuit shown in FIG. 2 is an example of a circuit for carrying out a filtering operation by computing a 3×3 matrix around the pixel which is actually subjected to the filtering operation. Each circle shown in FIG. 3 represents a pixel and the pixels arranged in the drawing as they actually appear in each frame. It is now assumed that the filtering operation is performed on pixel h shown in FIG. 3. The pixels located on the solid lines fall under one type of the same field, and the pixels on the broken lines belong to another type of the same field.

Referring to FIG. 2, the first-field pixel data stored in the first field memory 106 is input into an input terminal 201, while the second-field pixel data stored in the second field memory 107 is input into an input terminal 202. Selection switches 204 and 205, used for selecting the input pixels, selects terminal #1 to receive the first-field pixel data and selects terminal #2 to receive the second-field pixel data.

DL206 to DL214 designate delay circuits. Among these, DL206, DL207 and DL208 simultaneously output items of pixel data f, e, d, respectively, shown in FIG. 3. Also, DL209, DL210 and DL211 concurrently output items of pixel data i, h, g, respectively, shown in FIG. 3. DL212, DL213 and DL214 simultaneously output items of pixel data l, k, j, respectively.

The quantizing parameters employed for the pixel block including pixel h are input into an input terminal 203 from the parameter memory 108A. The quantizing parameters are further input into coefficient selection circuits 215 to 223 which constitute characteristics selection means for determining the suitable filter characteristics.

Figure 4:
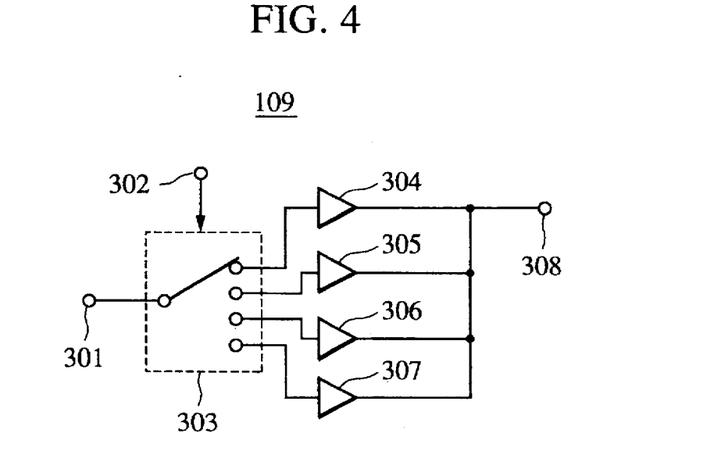
FIG. 4 is a block diagram of a coefficient selection circuit for use in the filter circuit of the present invention.

FIG. 4 illustrates an example of the construction of each of the selection circuits 215 to 223. In this example, the filtering operation is performed by classifying the quantizing coefficients into four groups (A, B, C, D) depending on the degree of degradation of the image data incurred during decoding. The pixel data is input into an input terminal 301 from each of the delay circuits DL206 to DL214. On the other hand, the quantizing parameters are input into an input terminal 302 from the terminal 203 shown in FIG. 2.

A selection switch 303 selects an output terminal depending on the group to which the quantizing coefficients extracted from the quantizing parameters input into the terminals 302 belong. Coefficient units 304 to 307 having different coefficients corresponding to the individual coefficient groups are connected to the respective output terminals of the selection switch 303. The data obtained by multiplying the pixel data by the coefficients set in the coefficient units 304 to 307 is output through an output terminal 308. For example, if the quantizing coefficients extracted from the input quantizing parameters belong to group A, all of the coefficient selection circuits 215 to 223 select the coefficient unit 304 allocated to the quantizing coefficients belonging to group A.

The individual items of pixel data output from the respective coefficient selection circuits 215 to 223 are input into an adder 22 in which they are added. The resulting data is output as data on the filtered pixel h from an output terminal 225. In this manner, the coefficients used for the filtering operation are selected according to the quantizing parameters. This makes it possible to use the suitable filtering coefficients in response to the degree of deterioration in the image data, thus realizing high quality filtered images.

Namely, when it is desired that the code length (the amount of data) be fixed by a unit of a predetermined number of blocks, it is necessary to reduce the amount of information (in other words, to increase the compression ratio) to a greater degree with respect to the blocks with higher definition.

Figure 7:
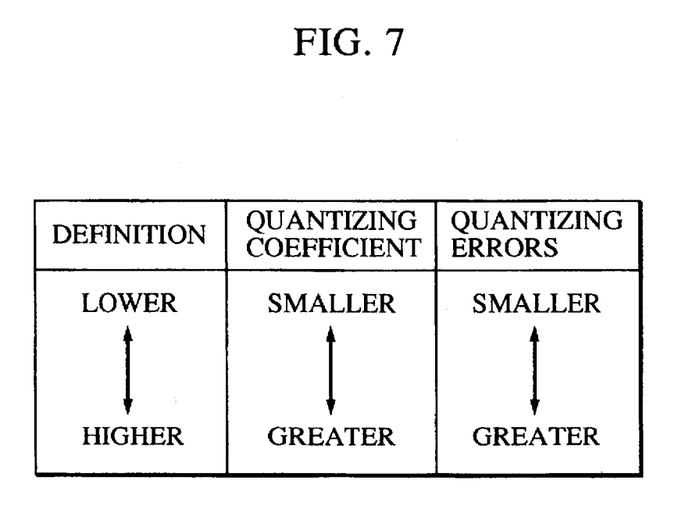
FIG. 7 illustrates the relationship of the quantizing parameters to the image definition and quantizing errors.

Accordingly, the relationship between high definition and the quantizing parameters is, as shown in FIG. 7, that the lower definition data requires smaller quantizing parameters and causes smaller quantizing errors which are eliminated by filtering operation. On the other hand, the higher definition data requires larger quantizing parameters and causes larger quantizing errors, thus resulting in an increased degree of data degradation.

Based on this relationship, in this embodiment filtering characteristics are varied according to the above-described quantizing parameters, whereby an optimal filtering operation is executed on the deteriorated signal data according to the quantizing parameters.

Figure 5:
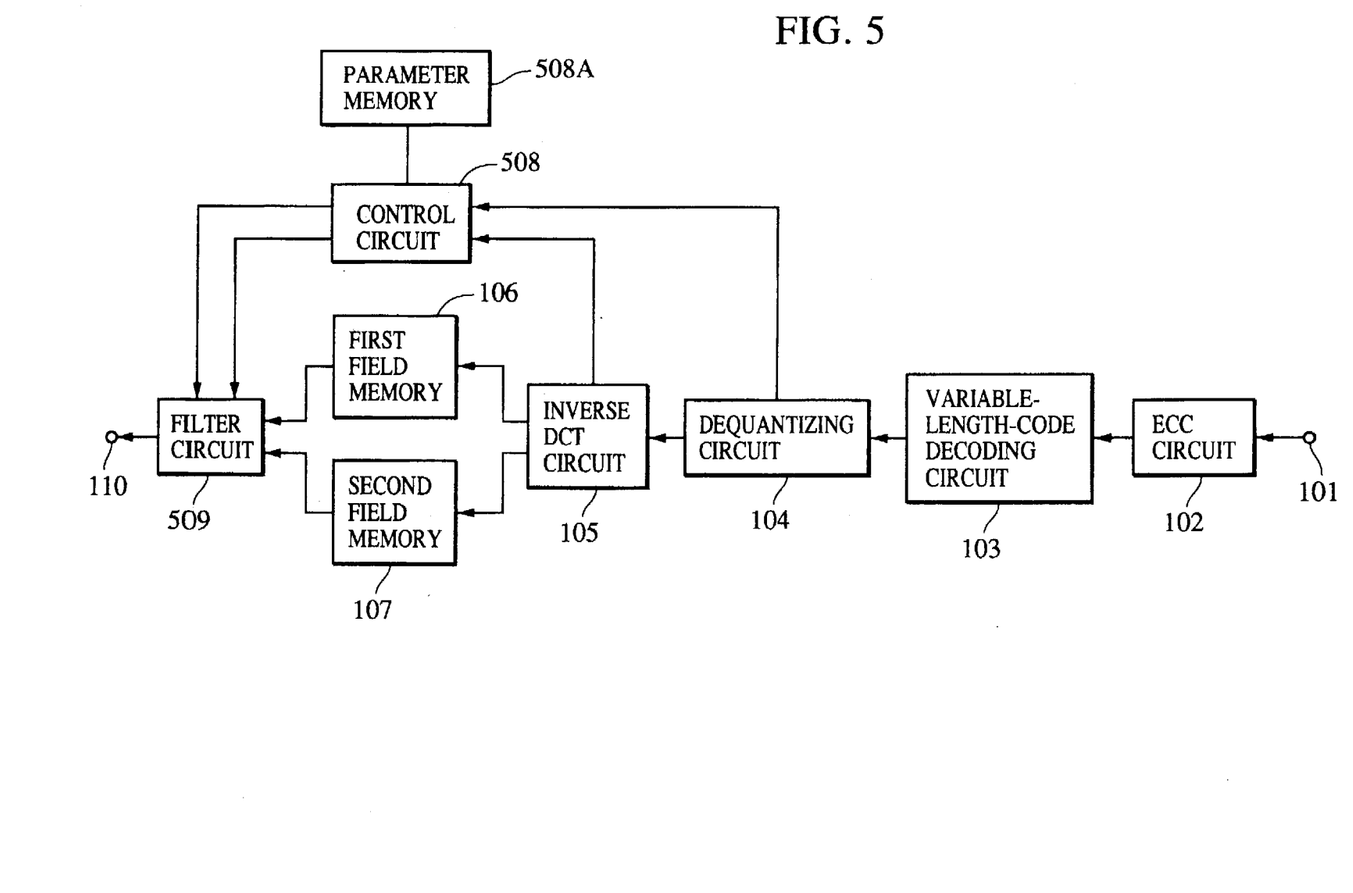
FIG. 5 is a block diagram of the construction of a second embodiment of an image signal decoder according to the present invention.

FIG. 5 is a block diagram of the construction of an image signal decoder according to a second embodiment of the present invention. The same circuits as those shown in FIG. 1 are designated by like reference numerals, a description thereof is omitted.

In FIG. 5, a control circuit 508 includes a parameter memory 508A for storing quantizing parameters used for the dequantizing operation and motion information employed for inverse DCT processing. A filter circuit 509 serves to reduce noise contained in the image data by use of the quantizing parameters and the motion information.

In the image signal decoder constructed as described above, a reproducing image signal sent from a recording medium (magnetic tape or the like) is input into the ECC circuit 102 through the input terminal 101. The data has its code errors corrected in the ECC circuit 102 and is decoded in the subsequent stage of variable-length-code decoding circuit 103. The dequantizing circuit 104 dequantizes, based on the quantizing parameters, the decoded data and transforms it into DCT coefficients. The quantizing parameters are output to the parameter memory 508A, while the transformed DCT coefficients are output to the inverse DCT circuit 105. The inverse DCT circuit 105 executes inverse DCT processing based on the motion information obtained together with the data concerning the given block. The circuit 105 then transforms the DCT coefficients to items of image data, and outputs them to the first and second memories 106 and 107, respectively, and outputs the motion information to the parameter memory 508A.

The items of image data that are output from the field memories 106 and 107 are input into the filter circuit 509. In the filter circuit 509, noise contained in the image data is suppressed, attenuating the noise components, and the filtered data is output to the output terminal 110. The filter circuit 509 is adapted to select the filter characteristics to be employed for the filtering operation in response to the quantizing parameters and/or the motion information read from the parameter memory 508A.

Figure 6:
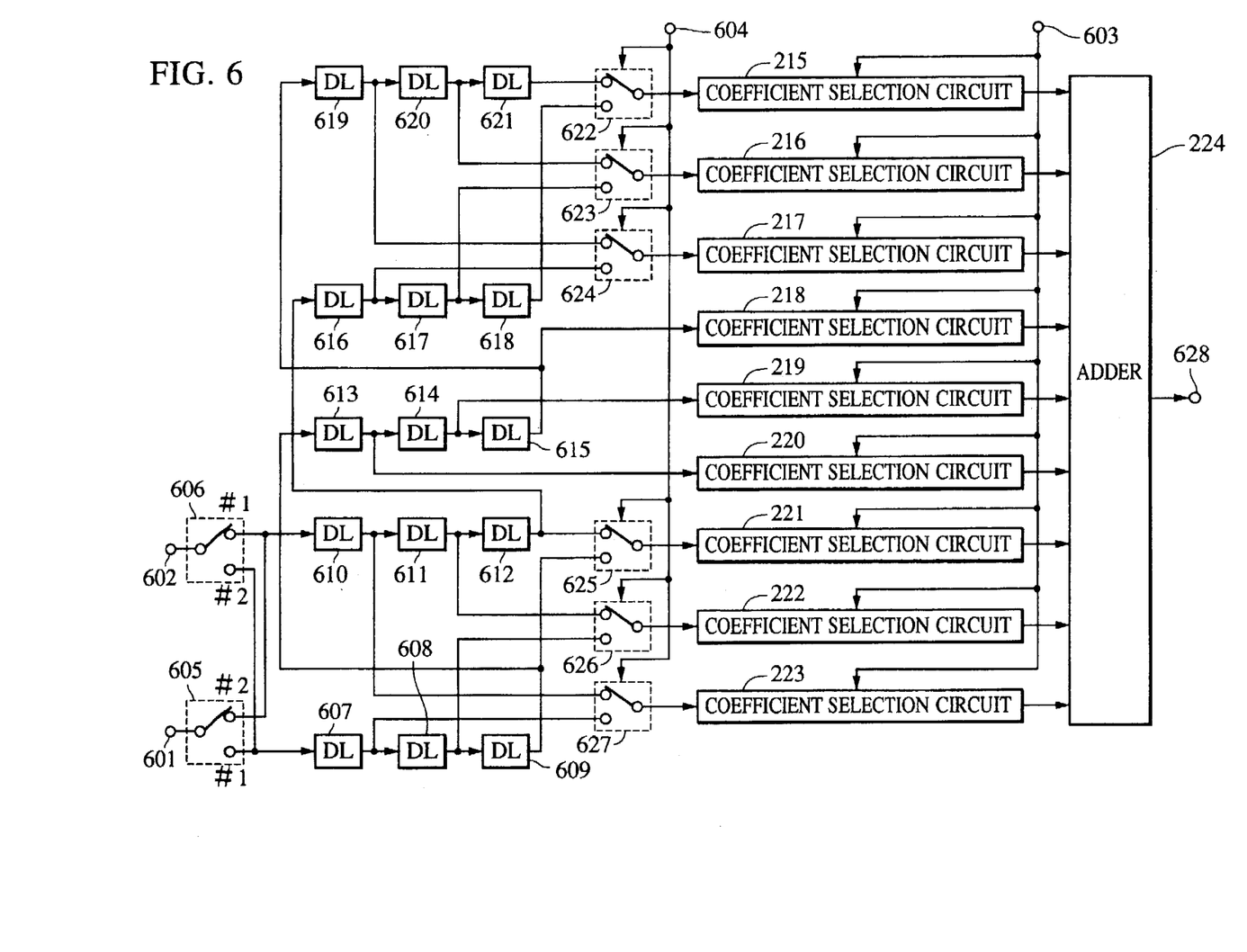
FIG. 6 is a block diagram of the construction of a filter circuit for use in the second embodiment.

A description is given below of the operation of the filter circuit 509 of this embodiment with reference to FIGS. 6 and 3. FIG. 6 is a block diagram of an example of the construction of the filter circuit 509 that carries out a filtering operation by computing a 3×3 matrix around the pixel which is actually subjected to the filtering operation. As has been discussed above, each circle shown in FIG. 3 represents a pixel. The arrangement of the pixels in the drawing are similar to the arrangement of those in each frame. It is now assumed that the filtering operation is performed on pixel h in FIG. 3. The pixels placed on the solid lines are classified in one type of the same field, and the pixels located on the broken lines are grouped in another type of the same field.

In FIG. 6, the pixel data of the first field stored in the first field memory 106 is input into an input terminal 601, while the pixel data of the second field stored in the second field memory 107 is input into an input terminal 602. Selection switches 605 and 606 for receiving the input pixels selects terminal #1 when the pixel to be subjected to the filtering operation falls under the first field, and on the other hand, selects terminal #2 when the pixel belongs to the second field.

DL607 to DL621 indicate delay circuits. Among these, DL619, DL620 and DL621 simultaneously output the items of pixel data c, b and a, respectively, shown in FIG. 3. DL616, DL617 and DL618 concurrently output the items of pixel data f, e and d, respectively, illustrated in FIG. 3. DL613, DL614 and DL615 simultaneously output items of pixel data i, h and g, respectively. DL610, DL611 and DL612 output the items of pixel data l, k and j, respectively, at the same time. DL607, DL608 and DL609 concurrently output the items of pixel data o, n and m, respectively.

The motion information concerning the pixel block including pixel h is input into an input terminal 604 from the parameter memory 508A. Selection switches 622 to 627 are controlled by the motion information sent from the input terminal 604. For example, it is now assumed that the motion information representing the fact that a pixel block including pixel h is located in a moving picture region is input. In this case, the pixel block has underwent DCT processing as data in the same field. The selection switches 622 to 627 thus select items of pixel data a, b, c, m, n and o, respectively, which are located in the vicinity of pixel h in the same field. On the other hand, it is now assumed that the motion information indicating the fact that the pixel block including pixel h is placed in a still picture region is input. In this case, the pixel block has been subjected to DCT processing as data in the same frame. The selection switches 622 to 627, therefore, select items of pixel data d, e, f, j, k and l, respectively, which are positioned adjacent to pixel h in the same frame.

The quantizing parameters employed for the pixel block including pixel h are input into an input terminal 603 from the parameter memory 508A. The quantizing parameters are input into coefficient selection circuits 215 to 223 in which the coefficients are selected in a manner similar to the first embodiment so that the data obtained by multiplying the input pixel data by the coefficients can be output to an adder 224. The respective items of data are further added in the adder 224, and the resulting data is output from an output terminal 628 as data of filtered pixel h.

In this manner, pixels to be used for a filtering operation are selected according to the motion information, and the coefficients to be employed for a filtering operation are further selected in accordance with the quantizing parameters. This enables an appropriate filtering operation according to the coding method employed and depending on the degree of degradation of the image data, thus attaining high quality of the filtered images.

As will be clearly understood from the foregoing description, the present invention offers the following advantages.

In the first embodiment, the filtering operation is performed according to the quantizing parameters employed for coding the image signal. It is thus possible to perform a suitable filtering operation in accordance with the degree of degradation of the image data, thereby achieving high quality filtered images.

Also, in the second embodiment either of pixels in the same field or pixels in the same frame are selected according to the motion information of a reproducing image signal. This also enables a suitable filtering operation depending on the degree of deterioration in the image data and also achieves an appropriate filtering operation in accordance with the coding method employed. As a result, even a higher quality of filtered images is achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A decoder comprising:
   a) input means for inputting information data that has been coded by using a predetermined coding parameter and parameter data indicating the predetermined coding parameter;

b) decoding means for decoding the information data by using the parameter data; and c) filter means for performing a filtering operation on the decoded data by said decoding means, filter characteristics of said filter means being set based on the the parameter data.

2. A decoder according to claim 1, wherein the coding parameter comprises a quantizing parameter.

3. A decoder according to claim 1, wherein said decoding means comprises a decoding circuit, a dequantizing circuit, and an inverse DCT circuit.

4. A decoder according to claim 1, wherein said filter means comprises a plurality of delay circuits, a plurality of coefficient units, and an adder.

5. A decoder according to claim 1, further comprising (d) error correction means for correcting errors of the coded data.

6. A decoder comprising:

a) input means for inputting information data that has been coded by using a predetermined coding parameter and parameter data indicating the predetermined coding parameter, b) decoding means for decoding the information data by using the parameter data;

c) filter means for performing a filtering operation on the decoded data; and d) control means for variously setting filter characteristics required for performing the filtering operation according to the parameter data.

7. A decoder according to claim 6, wherein the coding parameter comprises a quantizing parameter.

8. A decoder according to claim 6, wherein said decoding means comprises a decoding circuit, a dequantizing circuit, and an inverse DCT circuit.

9. A decoder according to claim 6, wherein said filter means comprises a plurality of delay circuits, a plurality of coefficient units, and an adder.

10. A decoder according to claim 6, wherein said control means comprises a memory circuit for storing the parameter data.

11. A decoder comprising:

a) input means for inputting information data that has been coded by using a predetermined coding parameter and parameter data indicating the predetermined coding parameter through a predetermined transmission system;

b) decoding means for decoding the information data by using the parameter data; and c) filter means for performing a filtering operation on the decoded data, filter characteristics of said filter means being set based on the parameter data.

12. A decoder according to claim 11, wherein said transmission system comprises magnetic recording/reproducing means.

13. A decoder according to claim 11, wherein said transmission system comprises optical recording/reproducing means.

14. A decoder according to claim 11, wherein said transmission system comprises a network.

15. A decoder according to claim 11, wherein the coding parameter comprises a quantizing parameter.

16. A decoder according to claim 11, wherein said decoding means comprises a decoding circuit, a dequantizing circuit, and an inverse DCT circuit.

17. A decoder according to claim 11, wherein said filter means comprises a plurality of delay circuits, a plurality of coefficient units, and an adder.

18. A decoder comprising:

a) input means for inputting image data that has been coded in a manner dictated by the presence or absence of motion and motion data indicating the presence or absence of motion of the image data;

b) decoding means for decoding the image data input by said input means, by using the motion data;

c) filter means for performing a filter operation on the image data decoded by said decoding means; and d) control means for variously setting filter characteristics required for performing the filtering operation according to the motion data.

19. A decoder according to claim 18, wherein said decoding means comprises a decoding circuit, a dequantizing circuit, and an inverse DCT circuit.

20. A decoder according to claim 18, wherein said filter means comprises a plurality of delay circuits, a plurality of coefficient units, and an adder.

21. A decoder according to claim 18, wherein said control means sets the filter characteristics according to a parameter employed for coding.

22. A decoder according to claim 21, wherein said parameters comprise a quantizing parameter.

23. A decoding method comprising the steps of:

a) inputting information data that has been coded by using a predetermined coding parameter and parameter data indicating the predetermined coding parameter;

b) decoding the information data by using the parameter data; and c) performing a filtering operation on the decoded data, filter characteristics required for the filtering operation being set based on the parameter data.

* * * * *

UNITED STATES PATENT AND TRADEMARK OFFICE
CERTIFICATE OF CORRECTION

PATENT NO. : 5,748,795

DATED : May 5, 1998

INVENTORS : SHINJI OHNISHI ET AL.

Page 1 of 2

It is certified that error appears in the above-identified patent and that said Letters Patent is hereby corrected as shown below:

COLUMN 1 line 15,  "Then" should read --Then,--;
line 16,  "an," should read --an--; and
line 65,  "comprises" should read --includes--.

COLUMN 3 line 63,  "selects" should read --select--; and
line 64,  "selects" should read --select--.

COLUMN 4 line 53,  "the higher" should read --higher--; and
line 66,  "a" should read --and a--.

COLUMN 5 line 50,  "selects" should read --select--; and
line 53,  "selects" should read --select--.

UNITED STATES PATENT AND TRADEMARK OFFICE
CERTIFICATE OF CORRECTION

PATENT NO. : 5,748,795

DATED : May 5, 1998

INVENTORS : SHINJI OHNISHI ET AL.

It is certified that error appears in the above-identified patent and that said Letters Patent is hereby corrected as shown below:

COLUMN 6 line 6, "underwent" should read --undergone--.

COLUMN 7 line 7, "the the" should read --the--.

Signed and Sealed this

Seventeenth Day of November, 1998

Attest:

BRUCE LEHMAN

Attesting Officer

Commissioner of Patents and Trademarks